United States Patent [19]

Hashimoto

[11] 4,286,767

[45] Sep. 1, 1981

[54] SOLENOID ACTUATED VALVE DEVICE

[75] Inventor: Kenji Hashimoto, Toyota, Japan

[73] Assignee: Aisin Seiki Kabushiki Kaisha, Kariya, Japan

[21] Appl. No.: 104,921

[22] Filed: Dec. 18, 1979

[30] Foreign Application Priority Data

Dec. 27, 1978 [JP] Japan ................................ 53-162701

[51] Int. Cl.³ ............................................ F16K 31/08
[52] U.S. Cl. ...................................... 251/65; 251/129; 251/139
[58] Field of Search ........................... 251/129, 65, 139

[56] References Cited

U.S. PATENT DOCUMENTS

| 2,637,343 | 5/1953 | Matthews | 251/65 |
| 3,001,549 | 9/1961 | Nelson et al. | 251/129 |
| 4,193,421 | 3/1980 | Sakakibara et al. | 137/625.33 |
| 4,216,938 | 8/1980 | Inada et al. | 251/65 |

Primary Examiner—Arnold Rosenthal
Attorney, Agent, or Firm—Sughrue, Mion, Zinn, Macpeak and Seas

[57] ABSTRACT

The solenoid actuated valve device is comprised of a substantially cylindrical housing of magnetic material having a hollow tubular core of magnetic material disposed coaxially therein. The ends of the housing are sealingly closed by end walls of magnetic material and the housing is provided with a radially disposed inlet port and an axially disposed outlet port in communication with the central chamber of the tubular core. An annular bobbin having a solenoid coil thereon is slidably mounted on the tubular core for opening and closing the radially disposed openings through the core. A pair of springs extending between the end of the housing and the bobbin normally bias the bobbin into closing position relative to said openings with each spring being connected to one end of the coil and an electric terminal, respectively. At least two permanent magnets are mounted in the housing radially outwardly of the solenoid coils so that the lines of flux of the permanent magnets intersect the coil at right angles thereto. Axially extending passages are provided adjacent the permanent magnets to prevent the buildup of air pressure at opposite ends of the permanent magnets which might adversely affect the accurate control of the movements of the bobbin. The hollow core is divided into two chambers by a partition with one of the chambers being in communication with the outlet port and the other chamber being in communication with the air space in which the two springs are located.

3 Claims, 3 Drawing Figures

SOLENOID ACTUATED VALVE DEVICE

BACKGROUND OF THE INVENTION

1. Field of the Invention

The present invention relates to a solenoid actuated valve device and more particularly to a solenoid actuated valve device for controlling the flow of fluid in proportion to the electric current supplied to the solenoid coil.

2. Prior Art

A conventional solenoid actuated valve device is comprised of a linear motor of the movable coil type and a valve means. The linear motor includes a core, a bobbin slidably mounted on the core, a solenoid coil wound on the bobbin, permanent magnets mounted adjacent the solenoid coil so that the magnetic flux of each magnet intersects the winding of the solenoid coil at right angles thereto, and a yoke or body forming a magnetic circuit with the core. The valve means in general includes a sliding valve member which slides with the bobbin on the core in response to an electric current flowing through the solenoid coil to thereby proportionally control the opening and closing of apertures formed in the core between an inlet port and an outlet port.

In such prior solenoid actuated valves, it is desirable that the clearance between the core and the permanent magnet be as small as possible to thereby increase the magnetic force acting on the bobbin. However, as the clearance is reduced, one chamber at the side of the inlet and outlet ports which is defined by the magnets, bobbin, core and the like is substantially isolated from the other chamber which is defined at the opposite side of said valve device by means of the magnets and the like. Therefore, when the bobbin is moved in a direction where the bobbin allows fluid communication between the inlet and outlet ports the volume of the other chamber is reduced and the fluid within the other chamber is compressed and pressurized. When the bobbin is moved in the opposite direction, the volume of the other chamber is increased and the fluid pressure within the other chamber is reduced. Thus, a differential in fluid pressure is created between the chambers on opposite sides of the permanent magnets in response to movement of the bobbin. Thus, the bobbin is urged by this differential in fluid pressure and the bobbin movements are not precisely controlled in proportion to the electric current supplied to the solenoid coil on the bobbin. Thus, the desired accurate control of the flow of fluid from the inlet port to the outlet port cannot be achieved.

SUMMARY OF THE INVENTION

It is an object of the present invention, therefore, to provide a new and improved solenoid actuated valve device which obviates the above-mentioned prior art drawbacks.

It is another object of the present invention to provide a new and improved solenoid actuated valve device which achieves the desired accurate control of the flow of fluid in proportion to the electric current supplied to the solenoid coil.

It is still another object of the present invention to provide a new and improved solenoid actuated valve device comprising a housing of magnetic material having a hollow tubular core of magentic material disposed coaxially therein with the ends of the housing sealingly engaging the ends of the core, an inlet port disposed in communication with the space between said housing and said core and an outlet port disposed in communication with the central chamber defined by the hollow tubular core, aperture means extending through said core to provide communication between said inlet port and said outlet port, an annular bobbin slidably mounted on said core to control the opening and closing of said apertures, a solenoid coil wound on said bobbin, spring means normally biasing said bobbin to the aperture closing position and being connected to said coil to supply electric current thereto, at least two permanent magnets secured to said housing in said space between said housing and said core with the lines of flux thereof intersecting the windings of said coil at right angles thereto and passage means extending the length of said magnets to provide communication between the chambers located within the space between said housing and said core at opposite ends of said magnets.

The foregoing and other objects, features and advantages of the invention will be apparent from the following more particular description of preferred embodiments of the invention as illustrated in the accompanying drawings.

DETAILED DESCRIPTION OF THE INVENTION

Figure 1:
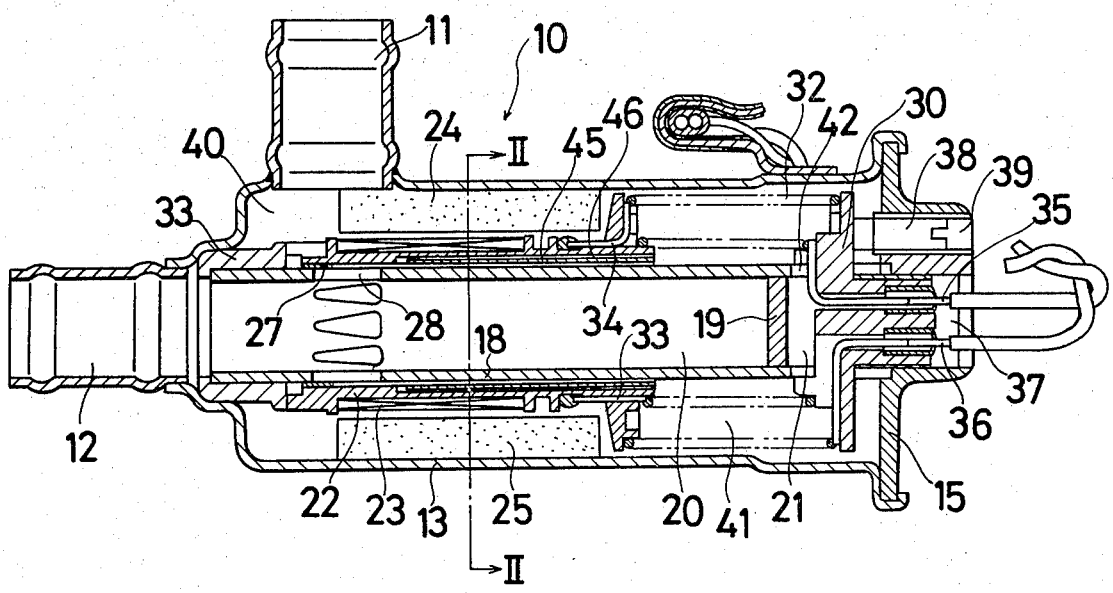
FIG. 1 is a sectional view of a solenoid actuated valve device according to the present invention.
Figure 2:
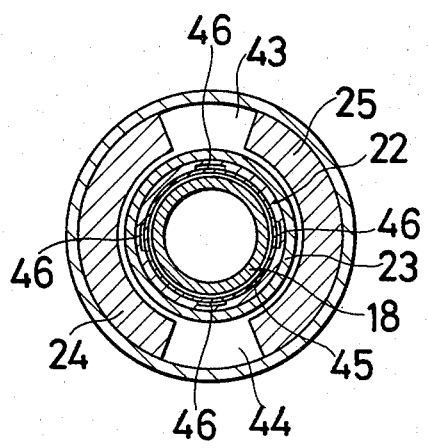
FIG. 2 is a sectional view taken along the line II—II in FIG. 1.

In accordance with the construction shown in FIGS. 1 and 2, a solenoid actuated valve device is comprised of a housing including a body 13 of magnetic material having a radially disposed inlet port 11 and an axially disposed outlet port 12 extending therethrough and a cover member 15 of magnetic material sealingly secured to each other. A hollow tubular core 18 of a suitable magnetic material such as steel is axially positioned within the body 13 and the central hollow portion of the core 18 is divided into first and second chambers 20 and 21 by means of an intercepting wall 19. The first chamber 20 is in constant communication with the outlet port 12. A bobbin 22 is slidably mounted on the core 18 and is made of suitable non-magnetic material such as a synthetic resin or the like and a solenoid coil 23 is wound on the bobbin 22. A pair of permanent magnets 24 and 25 is secured to the body 13 and are so positioned that the magnetic flux of each of the magnets 24 and 25 intersects the windings of the coil 23 at right angles thereto. Thus, a magnetic circuit for the magnets 24 and 25 is formed by means of core 18, body 13, and cover 15, thereby defining a linear motor of the movable coil type. A sliding valve 27 having an annular sleeve configuration is secured to the inner periphery of the bobbin 22 and the sliding valve 27 may be formed of any suitable non-magnetic material. Thus, the sliding valve 27 is adapted to be slidingly moved on the core 18. The core 18 has a plurality of axially elongated openings or apertures 28 to provide fluid communication between the inlet port 11 and the outlet port 12 through the first chamber 20. The sliding valve 27 is adapted to be moved relative to the openings 28 in proportion to the electric current supplied to the coil 23 and thus, the effective area of the openings 28 is proportionally controlled.

The inner periphery of the bobbin 22 may be secured to a sleeve 45 of metal to reduce the sliding resistance when the bobbin 22 slides axially on the core 18. Furthermore, a plurality of passages 46 may be formed between the bobbin 22 and the sleeve 45. The cover member 15 includes a guide member 30 of magnetic material which is disposed in contact with the adjacent end of the core 18 to complete the magnetic circuit. A pair of springs 31 and 32 are inserted between the guide member 30 and the bobbin 22 with the diameter of the spring 32 being greater than the diameter of the spring 31. Both springs 31 and 32 bias the bobbin 22 toward the left as viewed in FIG. 1 so that the bobbin 22 is normally maintained in its illustrated or original position where the left end of the bobbin 22 is maintained on contact with a stopper 33 secured to the body 13. As a result, a sliding valve 27 is maintained in its original position as illustrated in FIG. 1 wherein the apertures 28 are closed. The ends of the springs 31 and 32 adjacent the bobbin are connected to opposite ends of the solenoid coil 23 through terminals 33 and 34, respectively. The opposite ends of the springs 31 and 32 extend through the guide member 30 and are connected to a suitable power supply by means of terminals 35 and 36. Thus, springs 31 and 32 are adapted to function as conductive members. The terminals 35 and 36 are protected by means of insulating material 37. An adjusting screw 38 is threaded through the cover 15 into contact with the guide member 30 to adjust the position of the guide member 30 to vary the biasing forces of the springs 31 and 32. The adjusting screw 38 is sealed by means of a seal member 39.

Within the body 13, a pair of chambers 40 and 41 are defined at opposite ends of the magnets 24 and 25. The chamber 40 is always disposed in communication with the inlet port 11 and the chamber 41 is disposed in communication with the chamber 21 by means of one or more slots 42 extending through the core 18. The chambers 40 and 41 are maintained in constant communication with each other by means of passages 43 and 44 which are defined between the magnets 24 and 25 as best seen in FIG. 2. Thus, there will not be any differential in pressure between the chambers 40 and 41 when the bobbin 22 with the sliding valve member 27 is moved. The passages 46 located adjacent the sleeve 45 also assist in preventing a pressure differential between the chambers 40 and 41.

In operation, under normal or non-operating conditions where no electric current flows through the solenoid coil 23, the bobbin 22 with the sliding valve 27 is maintained in its original or illustrated position by means of the springs 31 and 32 whereby the openings 28 are closed by the sliding valve 27. This means that the fluid communication between the inlet port 11 and the outlet port 12 is interrupted. Under these conditions, the magnetic fluxes of the magnets 24 and 25 form a closed loop through the core 18, body 13, cover 15 and guide member 30 and a portion of the magnetic flux passes through the solenoid coil 23. When an electric current flows through the solenoid coil 23, an electromagnetic force is generated in proportion to the electric current when will move the bobbin having the coil and valve thereon to the right as viewed in FIG. 1. Accordingly, the apertures 28 are opened to an extent determined by the movement of the bobbin and thus, the effective open area of the apertures 28 is proportionally increased in proportion to the right-hand movement of the bobbin 22 having the sliding valve thereon.

During the movement of the bobbin 22, the effective volumes of chambers 40 and 41 are correspondingly increased and decreased, respectively. It is noted, however, that no difference in pressure are generated between the chambers 40 and 41 because both chambers 40 and 41 ar fluidically connected to each other by means of the passages 43 and 44. Therefore, there will not be any pressure differential acting on the bobbin 22 and the bobbin 22 with the sliding valve 27 can move precisely in proportion to the electric current which flows through the coil.

The inlet port 11 may be connected to an atmospheric pressure source and the outlet port 12 may be connected to the intake system of a vehicle. Furthermore, the solenoid coil 23 may receive electric current from a computer which is adapted to deliver an electrical output signal in response to engine temperature, engine vacuum, the number of engine revolutions and the like. Thus, the above-mentioned solenoid actuated valve device may be applied within a well known air-fuel ratio control system to act as an emission control system.

Figure 3:
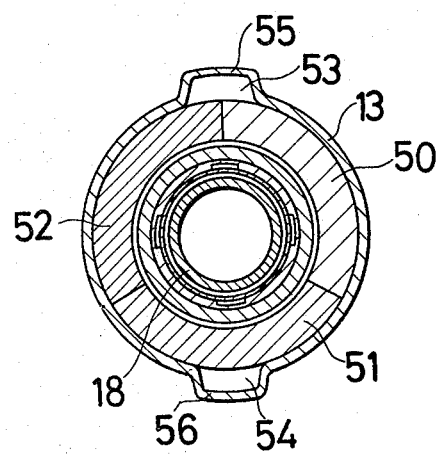
FIG. 3 is a view similar to FIG. 2 showing a modified form of the present invention.

In FIG. 3, a modified form of the present invention is shown wherein three permanent magnets 50, 51 and 52 are positioned without any circumferential gaps therebetween to provide an increased attracting force for the bobbin. However, in this modification, the body 13 has a pair of convex bulges which define axially extending passages 53 and 54 which function in substantially the same manner as passages 43 and 44 described in the previous embodiment. Thus, there will not be any difference in pressure between the chambers located at opposite ends of the bobbin.

While the invention has been particularly shown and described with reference to preferred embodiments thereof, it will be understood by those in the art that the foregoing and other changes in form and detail may be made therein without departing from the spirit and scope of the invention.

What is claimed is:

1. A solenoid actuated valve device for controlling the flow of fluid comprising a body having an inlet port and an outlet port extending therethrough, a hollow tubular core axially mounted within said body with one end thereof disposed in communication with said outlet port and having at least one radially extending aperture therethrough to provide communication between said inlet port and said outlet port, a bobbin slidably mounted on said core to control the effective open area of said aperture, a solenoid coil wound on said bobbin, permanent magnet means secured in said body so that the magnetic flux thereof intersects the windings of said solenoid coil at right angles thereto, cover means secured to said body in engagement with the other end of said core, said body, said cover member and said core being of magnetic material to define a magnetic circuit with said permanent magnet means to provide a magnetic force causing said bobbin to move relative to said core when an electric current is passed through said coil, spring means biasing said bobbin to a position closing said aperture, a first chamber located within said body at one end of said permanent magnet means in communication with said inlet port, a second chamber disposed within said housing at the opposite end of said permanent magnet means adjacent said cover means and passage means providing fluid communication between said first and second chambers; said permanent magnet means being comprised of two circumferentially spaced apart permanent magnets secured to said body radially outwardly of said coil with the circumferential spaces between said magnets defining said passage means.

2. A solenoid actuated valve device for controlling the flow of fluid comprising a body having an inlet port and an outlet port extending therethrough, a hollow tubular core axially mounted within said body with one end thereof disposed in communication with said outlet port and having at least one radially extending aperture therethrough to provide communication between said inlet port and said outlet port, a bobbin slidably mounted on said core to control the effective open area of said aperture, a solenoid coil wound on said bobbin, permanent magnet means secured in said body so that the magnetic flux thereof intersects the windings of said solenoid coil at right angles thereto, cover means secured to said body in engagement with the other end of said core, said body, said cover member and said core being of magnetic material to define a magnetic circuit with said permanent magnet means to provide a magnetic force causing said bobbin to move relative to said core when an electric current is passed through said coil, spring means biasing said bobbin to a position closing said aperture, a first chamber located within said body at one end of said permanent magnet means in communication with said inlet port, a second chamber disposed within said housing at the opposite end of said permanent magnet means adjacent said cover means and passage means providing fluid communication between said first and second chamber; said permanent magnet means being comprised of a plurality of circumferentially disposed magnets secured to said body in contact with each other to define an annular permanent magnet means and further comprising radially protruding channel means formed in said body outwardly of said annular permanent magnet means with the opposite ends of said channel means being disposed in communication with said first and second chambers.

3. A solenoid actuated valve device as set forth in claims 1 or 2, wherein said bobbin is comprised of an annular sleeve and further comprising an annular sleeve of anti-friction material radially disposed within said bobbin and additional passage means extending axially of said bobbin between said bobbin and said sleeve of anti-friction material to provide additional fluid communication between said first and second chambers.

* * * * *